US010260926B2

(12) United States Patent
Chen

(10) Patent No.: US 10,260,926 B2
(45) Date of Patent: Apr. 16, 2019

(54) INITIAL POSITIONING DEVICE, CONTAINER AND METHOD

(71) Applicant: BEIJING RED-SEA TECH CO., LTD., Beijing (CN)

(72) Inventor: Zengxin Chen, Beijing (CN)

(73) Assignee: BEIJING RED-SEA TECH CO., LTD., Beijing (CN)

(*) Notice: Subject to any disclaimer, the term of this patent is extended or adjusted under 35 U.S.C. 154(b) by 0 days.

(21) Appl. No.: 15/735,184

(22) PCT Filed: Jun. 10, 2016

(86) PCT No.: PCT/CN2016/085392
§ 371 (c)(1),
(2) Date: Dec. 10, 2017

(87) PCT Pub. No.: WO2016/197968
PCT Pub. Date: Dec. 15, 2016

(65) Prior Publication Data
US 2018/0172496 A1 Jun. 21, 2018

(30) Foreign Application Priority Data

Jun. 10, 2015 (CN) .......................... 2015 1 0317360
Jun. 10, 2015 (CN) ..................... 2015 2 0399410 U

(51) Int. Cl.
*B65D 25/56* (2006.01)
*B65D 83/00* (2006.01)
*G01F 11/38* (2006.01)
(52) U.S. Cl.
CPC .............. *G01F 11/38* (2013.01); *B65D 25/56* (2013.01); *B65D 83/00* (2013.01)

(58) Field of Classification Search
CPC ......... G01F 11/38; G01F 22/02; B65D 25/56; B65D 83/00; B67D 7/0205; B67D 7/36; A47K 3/1205
(Continued)

(56) References Cited

U.S. PATENT DOCUMENTS 745,876 A * 12/1903 Medley .................. B65D 25/48
215/3
1,242,176 A * 10/1917 Gross ...................... G01F 23/02
220/86.2
(Continued)

FOREIGN PATENT DOCUMENTS

CN 103693298 A 4/2014
CN 104029927 A 9/2014
(Continued)

OTHER PUBLICATIONS

WO 2014048341A1—English Transation, machine generated, Jul. 2018.*

*Primary Examiner* — Benjamin R Shaw
(74) *Attorney, Agent, or Firm* — Mark M. Friedman

(57) ABSTRACT

Provided is a self-metering container, an initial positioning device thereof and an initial positioning method. The container comprises a container body, a variable pressure component, a metering channel and an outflow channel. When the variable pressure component is depressurized, contents in the container body enter the metering channel; and when the variable pressure component is pressurized, the contents in the metering channel flow outwards via the outflow channel. The container further comprises an initial positioning device. The initial positioning device comprises a backflow cavity, a backflow channel and a component capable of closing the backflow channel. The backflow cavity is in communication with the variable pressure component and the initial end of the metering channel. The initial end of the
(Continued)

metering channel is higher than the bottom of the backflow cavity. The backflow channel is in communication with the bottom of the backflow cavity and the container body.

12 Claims, 5 Drawing Sheets

(58) Field of Classification Search
USPC ........................................................ 222/401
See application file for complete search history.

(56) References Cited

U.S. PATENT DOCUMENTS

| | | | | |
|---|---|---|---|---|
| 1,302,276 | A * | 4/1919 | Ballard | G01F 11/32 222/442 |
| 1,763,971 | A * | 6/1930 | Kantor | G01F 11/32 141/353 |
| 1,968,316 | A * | 7/1934 | Schmitt | G01F 11/084 222/153.08 |
| 2,017,145 | A * | 10/1935 | Dunn | B05B 11/0059 222/401 |
| 2,613,111 | A * | 10/1952 | Freund | B05B 11/06 222/323 |
| 3,254,809 | A * | 6/1966 | Breneman | A61J 7/0046 222/442 |
| 4,383,622 | A * | 5/1983 | Guth | B05B 11/06 222/209 |
| 4,986,452 | A * | 1/1991 | Takatsuki | A47J 41/0033 222/209 |
| 5,180,085 | A * | 1/1993 | Schmid | B05B 7/2427 222/211 |
| 5,197,866 | A * | 3/1993 | Kim | B67D 1/0425 222/209 |
| 5,738,254 | A * | 4/1998 | de la Guardia | B67D 3/047 222/400.8 |
| 6,119,900 | A * | 9/2000 | Iwamoto | B67D 1/0425 222/153.13 |
| 6,991,136 | B2 * | 1/2006 | de la Guardia | B67D 1/0425 222/209 |
| 7,131,558 | B2 * | 11/2006 | de la Guardia | B05B 9/0822 222/209 |
| 8,172,115 | B1 * | 5/2012 | Mulhauser | B05B 11/062 222/209 |
| 2006/0081657 | A1 * | 4/2006 | Bonner | B67D 7/005 222/401 |
| 2012/0036927 | A1 * | 2/2012 | Sanders | G01F 23/02 73/291 |
| 2013/0153605 | A1 * | 6/2013 | Chen | A45D 40/00 222/209 |
| 2014/0326757 | A1 * | 11/2014 | Chen | B05B 9/0816 222/209 |
| 2015/0183570 | A1 * | 7/2015 | Chen | B65D 25/38 220/661 |
| 2015/0240959 | A1 * | 8/2015 | Chen | B65D 81/24 222/1 |
| 2016/0002023 | A1 * | 1/2016 | Chen | B67D 7/0205 222/1 |
| 2018/0172496 | A1 * | 6/2018 | Chen | B65D 25/56 |

FOREIGN PATENT DOCUMENTS

| | | | |
|---|---|---|---|
| CN | 105236025 A | 1/2016 | |
| CN | 205150711 U | 4/2016 | |
| JP | 2011051602 A | 3/2011 | |
| WO | 2010001582 A1 | 1/2010 | |
| WO | WO 2014048341 A1 * | 4/2014 | ............ B65D 81/24 |

* cited by examiner

INITIAL POSITIONING DEVICE, CONTAINER AND METHOD

BACKGROUND

Technical Field

The present invention relates to an initial positioning device, a container, and a method, and in particular, to an initial positioning device used in a self-metering container, a container using such an initial positioning device, and an initial positioning method.

Related Art

Many liquids, such as liquid pesticides, chemistry reagents, sanitizers, degerming liquids, shampoos, shower gels, soy sauces, vinegar, edible oil, and liquid drugs, are used in people's life. To perform metering extraction on these liquids, metering tools such as a measuring cylinder, a measuring cup, and a pipette are usually used. There are many disadvantages when the metering tools are used. For example, the liquids are wasted and polluted by the metering tools, toxicity of the liquids is volatilized, or the liquids are oxidized by air. Therefore, in recent years, containers having a self-metering function are used to resolve the foregoing problems. When the liquids are placed in the containers having a self-metering function, an external metering tool is not required for extraction, so that the foregoing disadvantages can be avoided.

However, when metering extraction is performed by using the containers having a self-metering function, affected by factors such as an operating force, an operating speed, a volume of a liquid in a container body, and a volume of gases in a variable-pressure component, it is hard to fix an initial position of the liquid in a metering channel. Because the initial position for metering cannot be fixed, not only metering accuracy is affected, but operating convenience is affected. In some cases, the liquid may be sucked into the variable-pressure component due to an incident during metering extraction. This not only damages the variable-pressure component, but also pollutes the liquid. All of these obstruct popularization and application of the containers having a self-metering function in a wide range. On the other hand, intelligent kitchens, cooking robots, and the like have higher requirements on metering extraction of liquids such as edible oil, liquid salts, soy sauces, and vinegar. No suitable liquid metering method has been found yet.

An initial positioning device or a container having an initial positioning function is needed in people's life, to make each extraction process more accurate and convenient and less affected by external air or impurities.

SUMMARY

To resolve the foregoing problem that a container in the prior art does not have an initial positioning function, the present invention provides a self-metering container, including: a container body, a variable-pressure component, a metering channel, and an outflow channel, where when the variable-pressure component performs depressurization, a contained substance in the container body enters the metering channel; or when the variable-pressure component performs pressurization, the contained substance in the metering channel flows out through the outflow channel; and the self-metering container further includes an initial positioning device, where the initial positioning device includes: a backflow cavity, a backflow channel, and a component capable of closing the backflow channel;

the backflow cavity is in communication with a variable-pressure component and an initial end of a metering channel;

the initial end of the metering channel is higher than the bottom of the backflow cavity; and the backflow channel is in communication with the bottom of the backflow cavity and the container body.

When the variable-pressure component performs depressurization, the initial positioning device collects a liquid that exceeds an initial position of the metering channel in the backflow cavity. When liquid extraction is performed by means of pressurization, the liquid in the metering channel is extracted, and the liquid in the backflow cavity does not enter the metering channel again. In this way, metering starts from the initial position, and metering extraction or limited extraction is accurate and convenient. When there are many liquids in the backflow cavity, or after liquid extraction is completed, the backflow channel is opened, so that the liquid in the backflow cavity flows back to the container body, and is not wasted, oxidized by outside air or polluted. When the variable-pressure component further performs depressurization, an initial position of the liquid in the metering channel can be re-determined, and metering extraction or limited extraction is performed when pressurization is performed.

Because the self-metering container is simple in structure, mass production can be implemented and production costs can be reduced. The container can implement convenient, rapid, and accurate extraction of the contained substance during use. In addition, the backflow cavity can prevent the liquid in the metering channel from being mistakenly sucked into the variable-pressure component, and can further prevent gases in the metering channel from affecting metering accuracy. In this way, the self-metering container overcomes the various disadvantages of the metering containers in the prior art, and may be applied to the fields such as liquid containers, metering tools, intelligent kitchen systems, and cooking robots.

In the self-metering container, the component may be connected to a knob or a handle that is outside the container. An operator can manually close the backflow channel by using the component connected to the knob or the handle that is outside the container. This can ensure that the initial positioning device is simple in structure and the backflow channel is completely closed, thereby avoiding a failure of a liquid extraction function caused by a gas leakage in the backflow channel.

In the self-metering container, an outer diameter of the initial end of the metering channel is reduced. Because the outer diameter of initial end is reduced, a volume of liquids generated due to a surface tension and protruding from the initial end of the metering channel can be reduced, and a measurement error caused when different operating forces are applied can be reduced.

In the self-metering container, a spherical device may be suspended above the initial end of the metering channel. The spherical device is suspended above the initial end of the metering channel, so that the liquid can be prevented from flushing into the variable-pressure component when depressurization is performed, and a beautiful water curtain can further be generated after the liquid is sprayed. In this way, it is convenient for an operator to find by observing whether the liquid exceeds the initial end of the metering channel and determine whether next-step pressurization extraction needs to be performed.

In the self-metering container, an indication groove may be provided at a relatively low position on an outer side of the initial end of the metering channel. When the liquid flows out of the initial end of the metering channel, a little amount of the liquid is left in the indication groove on the initial end of the metering channel. An operator determines, by observing, whether there is a liquid in the indication groove, whether the liquid flows out of the initial end of the metering channel, and whether pressurization extraction can be started. Shaking of the container during use may enable the liquid in the indication groove to flow to the bottom of the backflow cavity.

In the self-metering container, the component may be a valve combination disposed in the backflow channel and closed when pressurized or depressurized by the variable-pressure component and opened when there is no change of pressure. By means of the valve combination in the backflow channel, it is ensured that gas leakage does not occur in the backflow channel when pressurization or depressurization is performed by the variable-pressure component and that the liquid in the backflow cavity flows back to the container body when there is no change of pressure. Because the liquid in the backflow cavity flows back automatically, use convenience is improved.

Specially, the valve combination may be two one-way valves in communication with each other and in reverse serial connection. Further, the one-way valve closer to the backflow cavity is closed when depressurized, and the other one-way valve is closed when pressurized. Further, a liquid storage cavity is disposed between the two one-way valves. By means of the commonly used one-way valves in the valve combination, adaptation of the initial positioning device is improved. Because the one-way valve closer to the backflow cavity is closed when depressurized, and space in the backflow cavity and the backflow channel is limited, the liquid in the metering channel can be completely returned. Because the liquid storage cavity is disposed between the two one-way valves, a volume of the backflow cavity can be properly reduced, so that the position of the liquid in the metering channel can change more quickly when the pressure changes.

Specially, the valve combination may include a valve plug capable of reciprocally moving in a valve body and an intermediate channel is disposed on an upstream end of the valve plug; the intermediate channel leads to a groove that is on an outer side surface of the valve plug; and an upstream end of the intermediate channel is in communication with the backflow cavity through the backflow channel, and a downstream end leads to the outside of the valve body through the groove that is on the outer side surface of the valve plug. The valve combination may have low costs and better sealing performance, so that the position of the liquid in the metering channel can change more quickly when the pressure changes.

Specially, the valve combination may include two openings sequentially provided in the backflow channel and a movable component located between the two openings. The valve combination is simple in structure, small in volume, and lower in costs. Further, the movable component is a sheet or a small ball. Because of the sheet or small ball, the valve combination has a relatively good sealing effect.

In the self-metering container, the variable-pressure component, the initial positioning device, the metering channel, the outflow channel, and the like are mounted on a top cover. Because the components are mounted on the top cover, a leakage at a joint of the channels caused when the components are mounted on the container body can be avoided. In addition, related components can be easily assembled, conveniently packaged and transported, and conveniently cleaned after use.

The present invention further provides an initial positioning device, including: a backflow cavity, a backflow channel, and a component capable of closing the backflow channel, where the backflow cavity is in communication with a variable-pressure component and an initial end of a metering channel;

the initial end of the metering channel is higher than the bottom of the backflow cavity; and the backflow cavity is in communication with a container body through the backflow channel.

The initial positioning device is simple in structure, making a self-metering container be convenient in use and accurate in metering, and preventing a liquid in the metering channel from being mistakenly sucked into the variable-pressure component, and can further prevent gases in the metering channel from affecting metering accuracy. In this way, various disadvantages of existing metering containers are overcome.

The present invention further provides an initial positioning method for a self-metering container, including the following steps:

A. closing a backflow channel between the bottom of a backflow cavity and a container body;

B. performing depressurization to enable a contained substance in the container body to enter a metering channel;

C. stopping the depressurization after the contained substance exceeds an initial end of the metering channel and enters the backflow cavity;

D. performing pressurization to enable the contained substance in the metering channel to flow out through an outflow channel;

E. observing a liquid level of the contained substance in the metering channel, and stopping the pressurization after a required volume is reached; and F. opening the backflow channel when the contained substance accumulated in the backflow cavity exceeds the initial end of the metering channel, to enable the contained substance in the backflow cavity to flow back to the container body.

The initial positioning method is easy in operation, convenient in use, and accurate in metering, and is suitable for being used by common citizens in daily life as well as by scientific research personnel for performing precision metering. Because the backflow channel is manually opened, the backflow channel can have better sealing performance when being closed, thereby providing a fast response to pressurization and depressurization.

The present invention further provides another initial positioning method for a self-metering container, including the following steps:

A. depressurizing a backflow cavity by using a variable-pressure component, so that a backflow channel between the bottom of the backflow cavity and a container body is closed, and a contained substance in the container body enters a metering channel;

B. stopping the depressurization after the contained substance exceeds an initial end of the metering channel and enters the backflow cavity;

C. automatically opening the backflow channel when there is no change of pressure in the backflow cavity, so that the contained substance in the backflow cavity flows back to the container body;

D. performing pressurization to enable the contained substance in the metering channel to flow out through an outflow channel; and E. observing a liquid level of the contained substance in the metering channel, and stopping the pressurization after a required volume is reached.

Because the step of automatically opening the backflow channel agrees with the step of extraction, the operation is more convenient.

DETAILED DESCRIPTION

Embodiment 1

Figure 1:
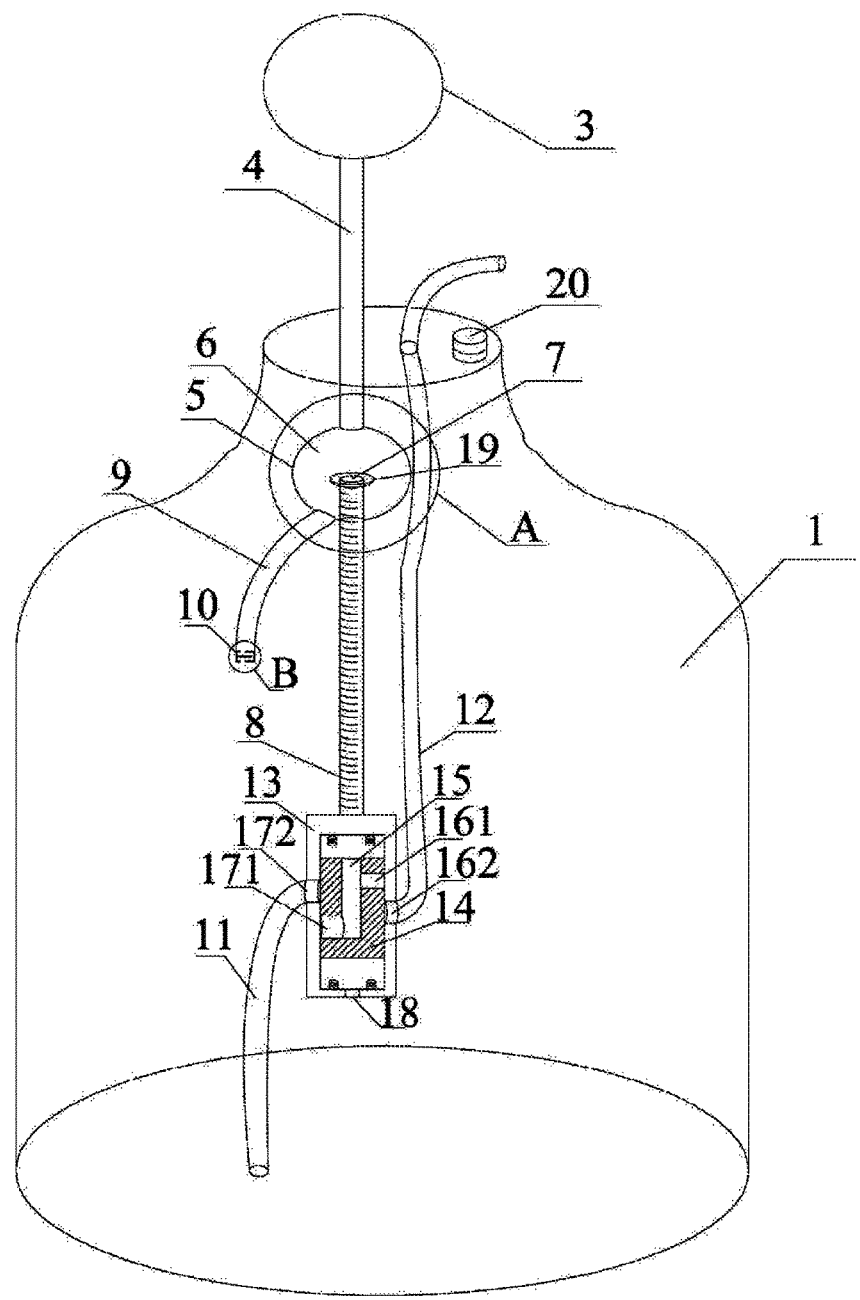
FIG. 1 is a schematic structural diagram of a self-metering container according to Embodiment 1.
Figure 2:
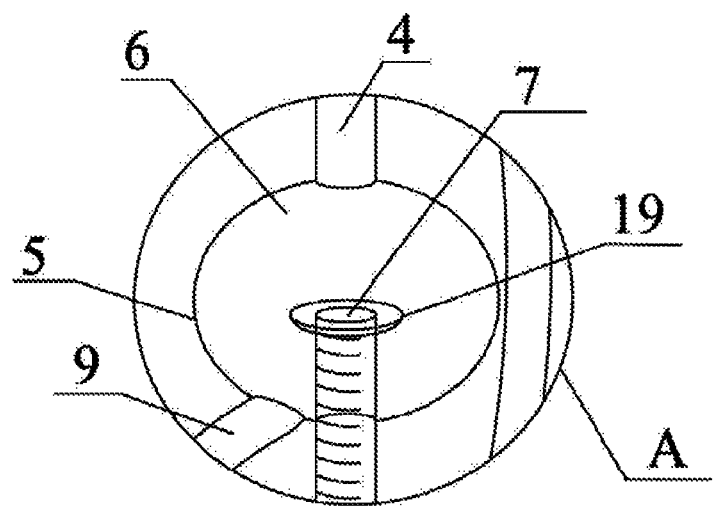
FIG. 2 is a partially enlarged view of a part A in FIG. 1.
Figure 3:
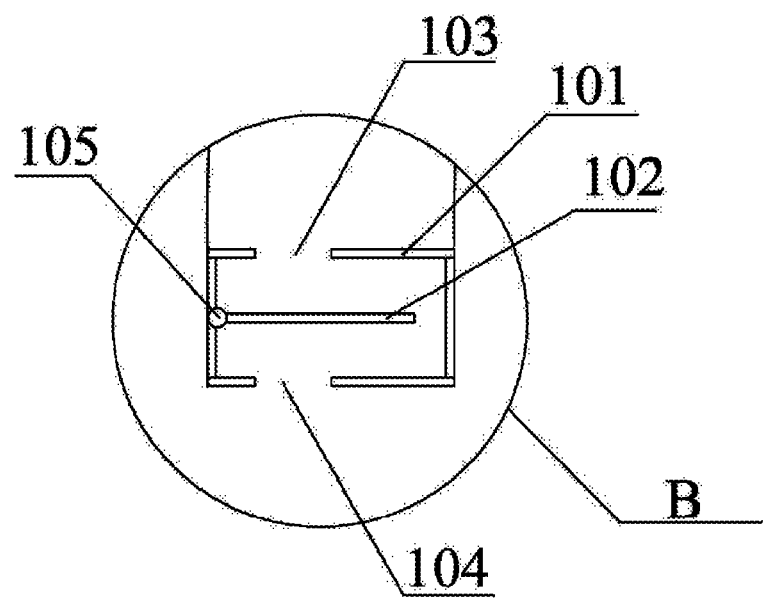
FIG. 3 is a partially enlarged view of a part B in FIG. 1.

As shown in FIG. 1, FIG. 2, and FIG. 3, FIG. 1, FIG. 2, and FIG. 3 show a container that uses an initial positioning system in the present invention according to Embodiment 1. The container includes a container body 1. A filling opening is provided on an upper portion of the container body 1. The filling opening is sealed by using a one-way valve 20 after a contained substance is filled in. The one-way valve 20 only allows gases to enter the container body 1. An opening of an outflow channel 12 and an opening of a variable-pressure channel 4 are reserved on the top of the container body 1.

A variable-pressure component is a component capable of pressurizing and depressurizing a backflow cavity 6 and includes an airbag 3 and the variable-pressure channel 4. The variable-pressure channel 4 runs through the top of the container body 1 and is in communication with the backflow cavity 6 surrounded by a housing 5. An initial end 7 of a metering channel 8 extends into the backflow cavity 6 and is higher than the bottom of the backflow cavity 6. An annular groove 19 is provided at a relatively low position on a periphery of the initial end 7 of the metering channel 8. When the contained substance exceeds the initial end 7 of the metering channel 8, a part of the contained substance is left in the annular groove 19, indicating that a position of a liquid level on the initial end is fixed and that the contained substance can be extracted by means of pressurization.

A backflow channel 9 is in communication with the bottom of the backflow cavity 6 and the container body 1. A valve combination 10 simple in structure and low in costs is disposed in the backflow channel 9. The valve combination 10 includes: a framework 101, an upper opening 103 and a lower opening 104 that are provided on the framework 101, a rotary spring 105 fixed on the framework 101, and a baffle plate 102 mounted on the rotary spring 105. The baffle plate 102 can seal the upper opening 103 when the backflow cavity 6 is depressurized and seal the lower opening 104 when the backflow cavity 6 is pressurized. When there is no change of pressure, the rotary spring can enable the baffle plate 102 to be located in a middle part, so that both the upper opening 103 and the lower opening 104 are opened.

A lower end of the metering channel 8 is connected to a control valve including a valve body 13 and a valve plug 14 and is in communication with an intermediate channel 15 in the valve plug 14. The valve body 13 in the control valve is externally connected to three channels: a liquid extraction channel 11, the outflow channel 12, and the metering channel 8. The liquid extraction channel 11 leads to the bottom of the container body 1. The valve plug 14 in the control valve is located in an internal cavity of the valve body 13 and is capable of sliding up and down in the cavity. Space between an outer peripheral side of the valve plug 14 and an internal wall of the valve body 13 is sealed by using a liquid. The intermediate channel 15 is in the valve plug 14. The intermediate channel 15 has an opening 161 and an opening 171 on an outer peripheral side surface of the valve plug. An opening 162 and an opening 172 are provided on the valve body. The opening 162 is in communication with the outflow channel 12, and the opening 172 is in communication with the liquid extraction channel 11.

According to different positions to which the valve plug 14 reciprocally slides in the valve body 13, there are three different communication relationships between the opening 161 and the opening 162, and the opening 171 and the opening 172: only the opening 161 is in communication with the opening 162; neither the opening 161 is in communication with the opening 162 nor the opening 171 is in communication with the opening 172 (where the state is shown in FIG. 1); and only the opening 171 is in communication with the opening 172. A spring is mounted on each of two ends of the cavity. The springs enable the valve plug 14 to be at a position that prevents the opening 161 from being in communication with the opening 162 and the opening 171 from being in communication with the opening 172 when there is no external pressure. A pressure relief opening 18 is disposed on a lower end of the valve body 13. The pressure relief opening 18 leads to the inside of the container body 1.

An outflow end of the outflow channel 12 extends out of the container body 1.

Steps of extracting the contained substance in the container from the container are as follows:

The squeezed airbag 3 is released, so that the airbag 3 depressurizes the backflow cavity 6 by using the variable-pressure channel 4.

The baffle plate 102 seals the opening 103 under negative pressure, so that the backflow channel 9 is closed.

The valve plug 14 moves upward under the negative pressure, and the opening 171 is in communication with the opening 172, so that the liquid extraction channel 11 is in communication with the metering channel 8 through the intermediate channel 15. The contained substance enters the metering channel 8 from the container body 1 under the negative pressure. When the contained substance that enters the metering channel 8 exceeds the initial end 7, the contained substance flows to the annular groove 19, and flows to the bottom of the backflow cavity 6.

After the airbag 3 completes the depressurization, there is no negative pressure in the backflow cavity 6 or the backflow channel 9, so that the baffle plate 102 returns to the middle part of the valve combination 10 under the action of the rotary spring 105, both the opening 103 and the opening 104 are opened, and the contained substance in the backflow cavity 6 and the backflow channel 9 flows back to the container body 1. The valve plug 14 moves downward under the action of the spring that is on an upper end of the valve body 13, and the opening 161 is not in communication with the opening 162 and the opening 171 is not in communication with the opening 172.

When the contained substance needs to be extracted, the airbag 3 is squeezed, so that the airbag 3 pressurizes the backflow cavity 6 by using the variable-pressure channel 4.

The baffle plate 102 seals the opening 104 under positive pressure, so that the backflow channel 9 is closed.

The valve plug 14 moves downward under the positive pressure, and the opening 161 is in communication with the opening 162, so that the outflow channel 12 is in communication with the metering channel 8 through the intermediate channel 15. The contained substance in the metering channel 8 (from the initial end 7) flows out from the outflow channel 12 under the positive pressure. An outflow amount may be determined according to a graduation on the metering channel 8. There is a maximum outflow amount, and the maximum outflow amount is a total amount of the contained substance in the metering channel 8 and in a portion that is of the intermediate channel 15 and that is above a horizontal position at which the opening 161 is located. By means of this embodiment, metering extraction and limited extraction can be implemented.

After the extraction is completed, the pressurization is stopped and there is no positive pressure in the backflow cavity 6 or the backflow channel 9, so that the baffle plate 102 returns to the middle part of the valve combination 10 under the action of the rotary spring 105, and both the opening 103 and the opening 104 are opened. The valve plug 14 moves upward under the action of the spring that is at the lower end of the valve body 13, and the opening 161 is not in communication with the opening 162 and the opening 171 is not in communication with the opening 172.

The one-way valve 20 allows gases outside the container body to enter the container under external atmospheric pressure, until internal pressure of the container body 1 is equal to external pressure of the container body 1. Because of the existence of the one-way valve 20, only a limited amount of outside gases can be in contact with the contained substance in the container body 1. This can reduce pollution to and oxidation of the contained substance.

In this way, the container is ready for next-time metering (limited) extraction.

Embodiment 2

Figure 4:
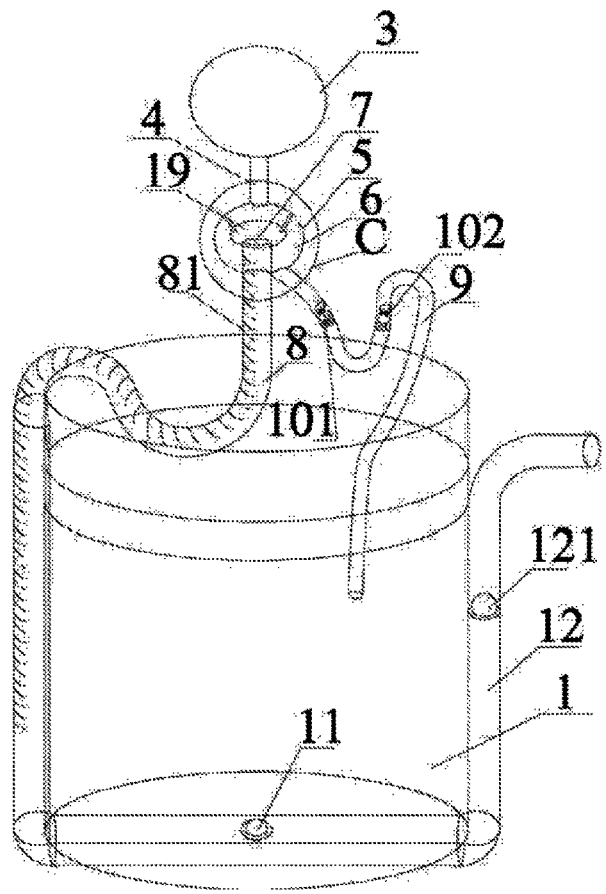
FIG. 4 is a schematic structural diagram of a self-metering container according to Embodiment 2.
Figure 5:
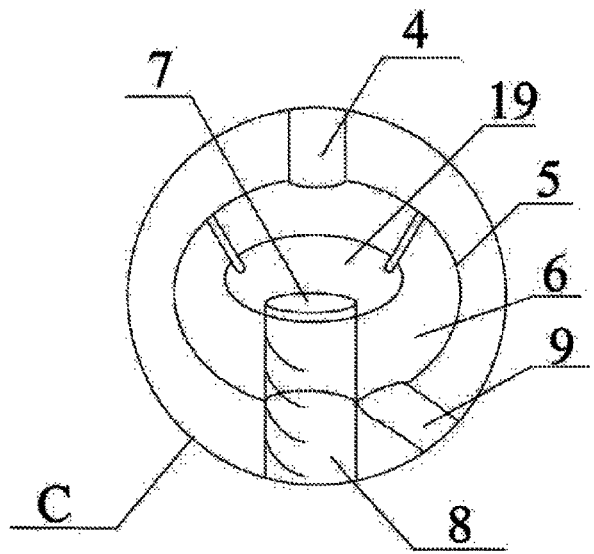
FIG. 5 is a partially enlarged view of a part C in FIG. 4.

As shown in FIG. 4 and FIG. 5, FIG. 4 and FIG. 5 show a container according to Embodiment 2. The container includes components such as a container body 1, a variable-pressure component including an airbag 3 and a variable-pressure channel 4, a backflow cavity 6 surrounded by a cavity wall 5, a metering channel 8 located above, on a side wall of, and at the bottom of the container body 1, an outflow channel 12, and a backflow channel 9 including two one-way valves in reverse serial connection.

Specifically, the backflow cavity 6 is in communication with the variable-pressure channel 4, the backflow channel 9, and the metering channel 8. An initial end 7 of the metering channel 8 extends into the backflow cavity 6, and a spherical device 19 is suspended above the initial end 7 of the metering channel 8. When a contained substance on the initial end of the metering channel 8 enters the backflow cavity 6, the spherical device 19 can enlarge a signal indicating that the contained substance enters the backflow cavity 6, so that it is convenient for an operator to observe the signal. There is a graduation on an outer part of the metering channel 8 for indicating a volume of the metering channel from the initial end 7. A one-way valve 11 that only allows the contained substance in the container body 1 to enter the metering channel 8 is mounted at a position that is on the metering channel 8 and that is at the internal bottom of the container body 1. A one-way valve 121 that only allows the contained substance to flow out is mounted in the outflow channel 12. A valve combination sequentially including a one-way valve 101 and a one-way valve 102 is disposed in the backflow channel 9 from the backflow cavity 6. The one-way valve 101 closes the backflow channel 9 only when the backflow cavity 6 is under positive pressure, and the one-way valve 102 closes the backflow channel 9 only when the backflow cavity 6 is under negative pressure. There is a segment of the backflow channel 9 between the one-way valve 101 and the one-way valve 102. By means of the commonly used one-way valves, adaptation of the product can be improved, and repair and replacement costs can be reduced.

Steps of extracting the contained substance in the container from the container are as follows:

The squeezed airbag 3 is released, so that the airbag 3 depressurizes the backflow cavity 6 by using the variable-pressure channel 4.

The one-way valve 102 is closed under negative pressure, so that the backflow channel 9 is closed. The one-way valve 121 is closed under the negative pressure, so that the outflow channel 12 is closed. The one-way valve 11 is opened under the negative pressure, so that the contained substance in the container body 1 enters the metering channel 8 under the negative pressure. When the contained substance that enters the metering channel 8 exceeds the initial end 7, the contained substance lashes the spherical device 19 and flows to the bottom of the backflow cavity 6.

After the airbag 3 completes the depressurization, there is no negative pressure in the backflow cavity 6 or the backflow channel 9, so that both the one-way valve 102 and the one-way valve 101 are opened, and the contained substance in the backflow cavity 6 and the backflow channel 9 flows back to the container body 1 through the backflow channel 9.

When the contained substance needs to be extracted, the airbag 3 is squeezed, so that the airbag 3 pressurizes the backflow cavity 6 by using the variable-pressure channel 4.

The one-way valve 101 is closed under positive pressure, so that the backflow channel 9 is closed. The one-way valve 11 is closed under the positive pressure, so that the channel between the metering channel 8 and the container body 1 is closed. The one-way valve 121 is opened under the positive pressure, so that the outflow channel 12 is opened, and the contained substance flows out.

An outflow amount may be determined according to the graduation on the metering channel 8. Squeezing of the airbag 3 is stopped when a required amount is reached, so that the contained substance stops flowing out. By means of this embodiment, metering extraction and limited extraction can be implemented.

After the pressurization is stopped, there is no positive pressure in the backflow cavity 6 or the backflow channel 9, so that the one-way valve 101 and the one-way valve 102 are opened, and the contained substance (if there is) in the backflow cavity 6 flows back to the container body 1.

In this way, the container is ready for next-time extraction.

Embodiment 3

Figure 6:
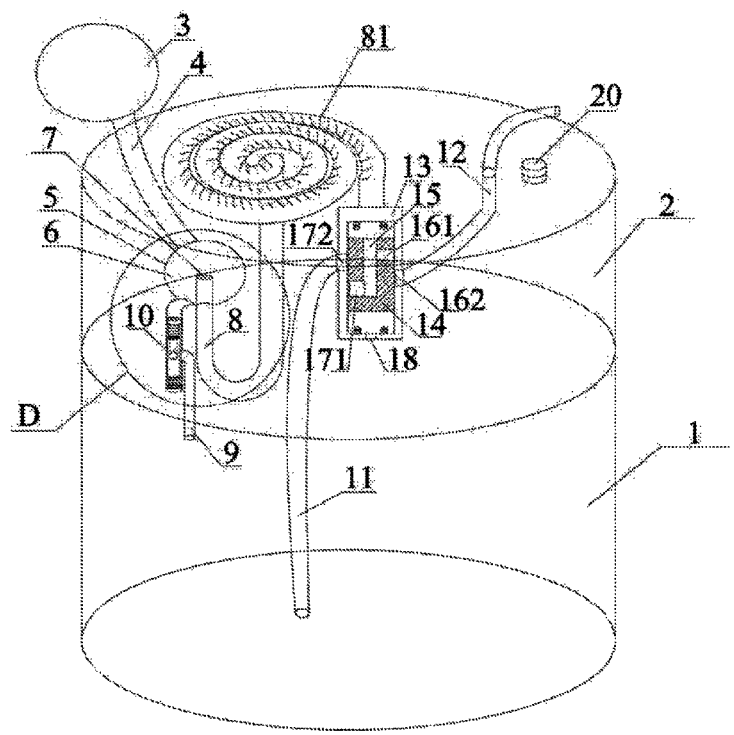
FIG. 6 is a schematic structural diagram of a self-metering container according to Embodiment 3.
Figure 7:
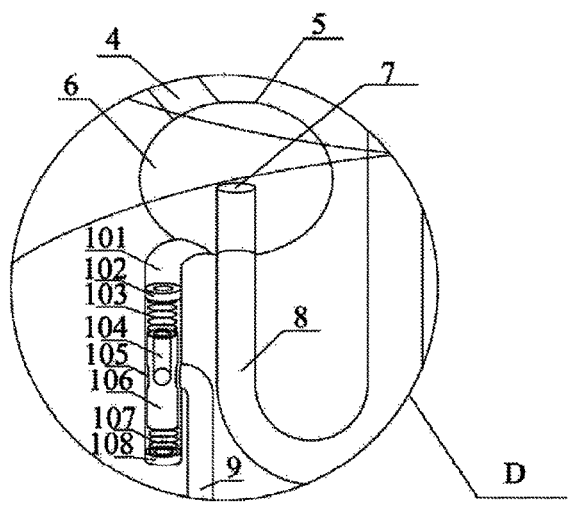
FIG. 7 is a partially enlarged view of a part D in FIG. 6.

As shown in FIG. 6 and FIG. 7, FIG. 6 and FIG. 7 show a container that uses an initial positioning system in the present invention according to Embodiment 3. The container substantially includes a container body 1 and a top cover 2, and the top cover 2 is an upper portion of the container body 1. The container body 1 contains most of a contained substance. Other components such as a variable-pressure component, an initial positioning device, a metering channel 8, a liquid extraction channel 11, an outflow channel 12, and a valve are mounted on the top cover. The top cover 2 further includes a one-way valve 20, and the one-way valve 20 only allows liquids and gases to enter the container body 1.

The variable-pressure component is a component capable of pressurizing and depressurizing a backflow cavity 6 and includes an airbag 3 and a variable-pressure channel 4. The airbag 3 is located above the top cover 2 and is fixed to the top cover 2 by using the variable-pressure channel 4. The variable-pressure channel 4 runs through the top of the top cover 2 and is in communication with the backflow cavity 6 that is located in the top cover 2 and that is surrounded by a housing 5. An initial end 7 of the metering channel 8 extends into the backflow cavity 6 and is higher than the bottom of the backflow cavity 6. A backflow channel 9 is in communication with the bottom of the backflow cavity 6 and the container body 1. The backflow channel 9 includes three sections: an upstream segment 101, an internal segment (a valve combination 10), and a downstream segment. The valve combination 10 has good sealing performance and includes a valve plug 106 capable of reciprocally moving in a valve body. An intermediate channel 104 is disposed on an upstream end of the valve plug. The intermediate channel 104 leads to a groove 105 that is on an outer side surface of the valve plug 106. The upstream segment 101 of the backflow channel 9 is in communication with the intermediate channel 104, and the downstream segment leads to the outer side surface of the valve plug 106 by using the valve body. An upper baffle 102 and a spring 103, and a lower baffle 108 and a spring 107 are capable of maintaining the valve plug 106 at a position that enables the groove 105 to be in communication with the downstream segment of the backflow channel 9 when there is no pressure in the backflow channel 9.

The initial end 7 of the metering channel 8 extends into the backflow cavity 6, and a middle segment is a metering segment that has a metering graduation 81, and an end is connected to a control valve that includes a valve body 13 and a valve plug 14, and is in communication with an intermediate channel 15 that is in the valve plug 14. The valve body 13 in the control valve is externally connected to three channels: the liquid extraction channel 11, the outflow channel 12, and the end of the metering channel 8. The liquid extraction channel 11 leads to the bottom of the container body 1. The valve plug 14 in the control valve is located in an internal cavity of the valve body 13 and is capable of sliding up and down in the cavity. Space between an outer peripheral side of the valve plug 14 and the valve body 13 is sealed by using a liquid. The intermediate channel 15 is in the valve plug 14. The intermediate channel 15 has an opening 161 and an opening 171 on an outer peripheral side surface of the valve plug. An opening 162 and an opening 172 are provided on the valve body. The opening 162 is in communication with the outflow channel 12, and the opening 172 is in communication with the liquid extraction channel 11.

According to different positions to which the valve plug 14 reciprocally slides in the valve body 13, there are three different communication relationships between the opening 161 and the opening 162, and the opening 171 and the opening 172: only the opening 161 is in communication with the opening 162; neither the opening 161 is in communication with the opening 162 nor the opening 171 is in communication with the opening 172 (where the state is shown in FIG. 6); and only the opening 171 is in communication with the opening 172. A spring is mounted on each of two ends of the cavity. The springs enable the valve plug 14 to be at a position that prevents the opening 161 from being in communication with the opening 162 and the opening 171 from being in communication with the opening 172 when there is no external pressure. A pressure relief opening 18 is disposed on a lower end of the valve body 13. The pressure relief opening 18 leads to the inside of the container body 1.

An outflow end of the outflow channel 12 extends out of the top cover 2.

Steps of extracting the contained substance in the container from the container are as follows:

The squeezed airbag 3 is released, so that the airbag 3 depressurizes the backflow cavity 6 by using the variable-pressure channel 4. The valve plug 106 in the valve combination 10 moves upward, and the groove 105 is not in communication with the downstream segment of the backflow channel 9.

The valve plug 14 in the control valve moves upward under negative pressure, and the opening 171 is in communication with the opening 172, so that the liquid extraction channel 11 is in communication with the metering channel 8 through the intermediate channel 15. The contained substance in the container body 1 enters the metering channel 8 under the negative pressure. When the contained substance that enters the metering channel 8 exceeds the initial end 7, the contained substance flows to the bottom of the backflow cavity 6.

After the airbag 3 completes the depressurization, there is no negative pressure in the backflow cavity 6 or the backflow channel 9. The valve plug 106 in the valve combination 10 moves downward under the action of the spring 103, the groove 105 is in communication with the downstream segment of the backflow channel 9, and the contained substance in the backflow cavity 6 and the backflow channel 9 flows back to the container body 1. The valve plug 14 in the control valve moves downward under the action of the spring that is on an upper end of the valve body 13, and the opening 161 is not in communication with the opening 162 and the opening 171 is not in communication with the opening 172.

When the contained substance needs to be extracted, the airbag 3 is squeezed, so that the airbag 3 pressurizes the backflow cavity 6 by using the variable-pressure channel 4.

The valve plug 106 in the valve combination 10 moves downward, and the groove 105 is not in communication with the downstream segment of the backflow channel 9.

The valve plug 14 in the control valve moves downward under positive pressure, and the opening 161 is in communication with the opening 162, so that the outflow channel 12 is in communication with the metering channel 8 through the intermediate channel 15. The contained substance in the metering channel 8 (from the initial end 7) flows out from the outflow channel 12 under the positive pressure. An outflow amount may be determined according to the graduation on the metering channel 8. There is a maximum outflow amount, and the maximum outflow amount is a total amount of the contained substance in the metering channel 8 and in a portion that is of the intermediate channel 15 and that is above a horizontal position at which the opening 161 is located. By means of this embodiment, metering extraction and limited extraction can further be implemented.

After the extraction is completed, the pressurization is stopped and there is no positive pressure in the backflow cavity 6 or the backflow channel 9, so that the valve plug 106 in the valve combination 10 moves upward, and the groove 105 is in communication with the downstream segment of the backflow channel 9. The valve plug 14 in the control valve moves upward under the action of the spring that is on the lower end of the valve body 13, and the opening 161 is not in communication with the opening 162 and the opening 171 is not in communication with the opening 172.

Likewise, Because of the existence of the one-way valve 20, only a limited amount of outside gases can be in contact with the contained substance in the container body 1. This can reduce pollution to and oxidation of the contained substance.

In this way, the container is ready for next-time metering (limited) extraction.

Embodiment 4

Figure 8:
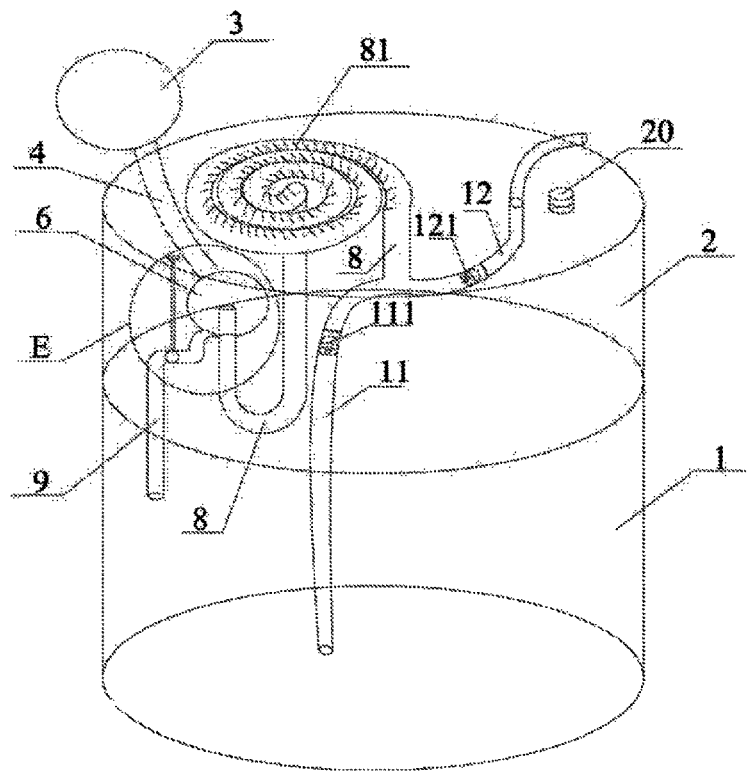
FIG. 8 is a schematic structural diagram of a self-metering container according to Embodiment 4.
Figure 9:
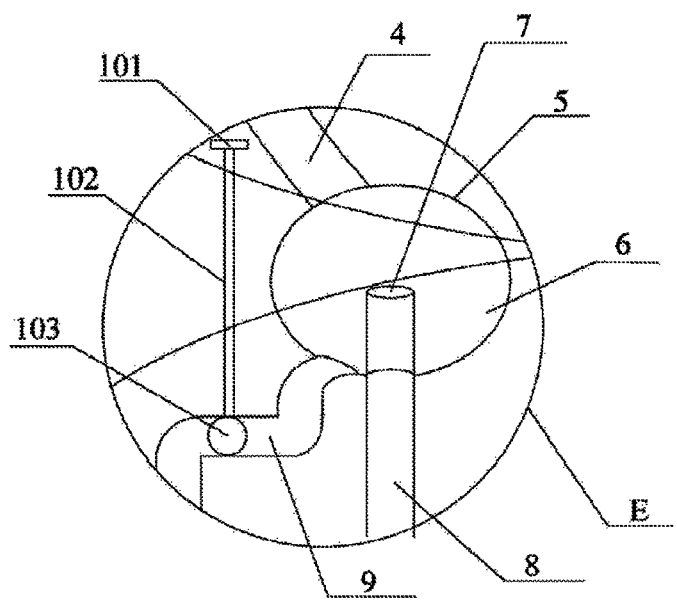
FIG. 9 is a partially enlarged view of a part E in FIG. 8.

As shown in FIG. 8 and FIG. 9, FIG. 8 and FIG. 9 show a container that uses an initial positioning system in the present invention according to Embodiment 4. The container substantially includes a container body 1 and a top cover 2, and the top cover 2 is an upper portion of the container body 1. The container body 1 contains most of a contained substance. Other components such as a variable-pressure component, an initial positioning device, a metering channel 8, a liquid extraction channel 11, an outflow channel 12, and a valve are mounted on the top cover. The top cover 2 further includes a one-way valve 20, and the one-way valve 20 only allows liquids and gases to enter the container body 1.

The variable-pressure component is a component capable of pressurizing and depressurizing a backflow cavity 6 and includes an airbag 3 and a variable-pressure channel 4. The airbag 3 is located above the top cover 2 and is fixed to the top cover 2 by using the variable-pressure channel 4. The variable-pressure channel 4 runs through the top of the top cover 2 and is in communication with the backflow cavity 6 that is located in the top cover 2 and that is surrounded by a housing 5. An initial end 7 of the metering channel 8 extends into the backflow cavity 6 and is higher than the bottom of the backflow cavity 6. A backflow channel 9 is in communication with the bottom of the backflow cavity 6 and the container body 1. A valve 103 is disposed in the backflow channel 9. The valve 103 is connected to a knob 101 that is outside the top cover 2 by using a connecting rod 102.

The initial end 7 of the metering channel 8 extends into the backflow cavity 6, a middle segment is a metering segment that has a metering graduation 81, and an end is in communication with the liquid extraction channel 11 and the outflow channel 12. The liquid extraction channel 11 leads to the bottom of the container body 1, and a one-way valve 111 that only allows the contained substance to flow upward is disposed in the liquid extraction channel 11. The outflow channel 12 leads to the outside of the top cover 2, and a one-way valve 121 that only allows a liquid to flow outward is disposed in the outflow channel 12.

Steps of extracting the contained substance in the container from the container are as follows:

The knob 101 is rotated, so that the backflow channel 9 between the bottom of the backflow cavity 6 and the container body 1 is closed.

The squeezed airbag 3 is released, so that the airbag 3 depressurizes the backflow cavity 6 by using the variable-pressure channel 4.

The one-way valve 111 is opened under negative pressure, so that the liquid extraction channel 11 is in communication with the metering channel 8. The contained substance enters the metering channel 8 from the container body 1 under the negative pressure. When the contained substance that enters the metering channel 8 exceeds the initial end 7, the contained substance flows to the bottom of the backflow cavity 6.

When the contained substance needs to be extracted, the airbag 3 is squeezed, so that the airbag 3 pressurizes the backflow cavity 6 by using the variable-pressure channel 4.

The one-way valve 121 is opened, so that the metering channel 8 is in communication with the outflow channel 12. The contained substance in the metering channel 8 (from the initial end 7) flows out from the outflow channel 12 under positive pressure. An outflow amount may be determined according to the graduation on the metering channel 8. There is a maximum outflow amount, and the maximum outflow amount is a total amount of the contained substance in the metering channel 8 and in a portion that is of the intermediate channel 15 and that is above a horizontal position at which the opening 161 is located. By means of this embodiment, metering extraction and limited extraction can further be implemented.

After the extraction is completed, the pressurization is stopped, so that the contained substance stops flowing out.

In this way, the container is ready for next-time metering (limited) extraction.

When the contained substance in the backflow cavity 6 is to exceed the initial end 7 of the metering channel 8, the knob 101 is rotated, so that the contained substance in the backflow cavity 6 flows back to the container body 1.

Because each metering starts from the initial end 7 of the metering channel 8, the metering is convenient and accurate.

Although the embodiments of the present invention are shown and described above, a person of ordinary skill in the art may understand that various changes, modifications, replacements, variations and combinations may further be made to the embodiments without departing from the principle and spirit of the present invention. For example, the variable-pressure component may be a barrel piston manual variable-pressure component, or the like. The scope of the present invention shall be subject to the appended claims and the equivalents thereof.

What is claimed is:

1. A self-metering container, comprising: a container body, a variable-pressure component, a metering channel, and an outflow channel, wherein when the variable-pressure component performs depressurization, a contained substance in the container body enters the metering channel; or when the variable-pressure component performs pressurization, the contained substance in the metering channel flows out through the outflow channel; and the self-metering container further comprises an initial positioning device, wherein a spherical device is suspended above the initial end of the metering channel; the initial positioning device comprises: a backflow cavity, a backflow channel, and a component capable of closing the backflow channel;

the backflow cavity is in communication with a variable-pressure component and an initial end of a metering channel;

the initial end of the metering channel is higher than the bottom of the backflow cavity; and the backflow channel is in communication with the bottom of the backflow cavity and the container body.

2. The self-metering container according to claim 1, wherein the component is connected to a knob or a handle that is outside the container.

3. The self-metering container according to claim 1, wherein the component is a valve combination disposed in the backflow channel and closed when pressurized or depressurized by the variable-pressure component and opened when there is no change of pressure.

4. The self-metering container according to claim 3, wherein the valve combination comprises two one-way valves in communication with each other and in reverse serial connection.

5. The self-metering container according to claim 4, wherein the one-way valve closer to the backflow cavity is closed when depressurized, and the other one-way valve is closed when pressurized.

6. The self-metering container according to claim 4, wherein a liquid storage cavity is disposed between the two one-way valves.

7. The self-metering container according to claim 3, wherein the valve combination comprises a valve plug capable of reciprocally moving in a valve body; an intermediate channel is disposed on an upstream end of the valve plug; the intermediate channel leads to a groove that is on an outer side surface of the valve plug; and an upstream end of the intermediate channel is in communication with the backflow cavity through the backflow channel, and a downstream end leads to the outside of the valve body through the groove that is on the outer side surface of the valve plug.

8. The self-metering container according to claim 3, wherein the valve combination comprises two openings sequentially provided in the backflow channel and a movable component located between the two openings.

9. The self-metering container according to claim 8, wherein the movable component is a sheet or a small ball.

10. The self-metering container according to claim 1, wherein the variable-pressure component, the initial positioning device, the metering channel, the outflow channel, and the like are mounted on a top cover.

11. An initial positioning device, comprising: a backflow cavity, a backflow channel, and a component capable of closing the backflow channel, wherein
  the backflow cavity is in communication with a variable-pressure component and an initial end of a metering channel;
  a spherical device is suspended above the initial end of the metering channel; the initial end of the metering channel is higher than the bottom of the backflow cavity; and
  the backflow cavity is in communication with a container body through the backflow channel.

12. An initial positioning method for a self-metering container, comprising the following steps:
  A. depressurizing a backflow cavity by using a variable-pressure component, so that a backflow channel between the bottom of the backflow cavity and a container body is closed, and a contained substance in the container body enters a metering channel;
  B. stopping the depressurization after the contained substance exceeds an initial end of the metering channel and enters the backflow cavity;
  C. automatically opening the backflow channel when there is no change of pressure in the backflow cavity, so that the contained substance in the backflow cavity flows back to the container body;
  D. performing pressurization to enable the contained substance in the metering channel to flow out through an outflow channel; and
  E. observing a liquid level of the contained substance in the metering channel, and stopping the pressurization after a required volume is reached.

* * * * *